United States Patent [19]
Nakano

[11] Patent Number: 5,355,074
[45] Date of Patent: Oct. 11, 1994

[54] GAS TURBINE GENERATOR UNIT

[75] Inventor: Norio Nakano, Tokyo, Japan

[73] Assignee: Nissan Motor Company, Ltd., Yokohoma, Japan

[21] Appl. No.: 3,912

[22] Filed: Jan. 13, 1993

[30] Foreign Application Priority Data

Jan. 14, 1992 [JP] Japan .................. 4-004541

[51] Int. Cl.$^5$ ............................................. H02K 5/00
[52] U.S. Cl. ............................................. 322/1; 60/602
[58] Field of Search .............. 322/1; 181/229; 60/600, 60/601, 602

[56] References Cited

U.S. PATENT DOCUMENTS

| | | | |
|---|---|---|---|
| Re. 30,306 | 6/1980 | Moore et la. | 181/229 |
| 4,183,332 | 1/1980 | Hofbauer et al. | 123/52 M |
| 4,197,922 | 4/1980 | Weber et al. | 181/229 |
| 4,254,625 | 3/1981 | Bergstedt et al. | 60/602 |
| 4,539,162 | 9/1985 | Ferrell | 261/1 |
| 4,647,835 | 3/1987 | Fujikawa et al. | 322/1 |

OTHER PUBLICATIONS

"A Gas Turbine Generator Cooling System", Technical Invention Report, vol. 13-11, No. 88-3314, Mar. 22, 1988, Japan.
General Electric, The General Electric, "Gas Turbine System LM2500", p. 5.

Primary Examiner—Kristine L. Peckman
Attorney, Agent, or Firm—Lowe, Price, LeBlanc & Becker

[57] ABSTRACT

A gas turbine generator unit which is small-sized to be portable. The generator unit comprises a generator directly driven by a gas turbine. The rotatable shaft of the generator is coaxially connected with the rotor shaft of the gas turbine engine. An air filter box having an air filter element is disposed in a manner that the extension of the axis of the generator rotatable shaft passes through the air filter box. The air filter box is located on the opposite side of the gas turbine compressor with respect to the generator. Additionally, an intake silencer for reducing intake air noise is disposed fluidly connect the air filter box and the air intake port of the compressor. The intake silencer is located to extend generally parallel with the axis of the generator rotatable shaft.

18 Claims, 5 Drawing Sheets

5,355,074

GAS TURBINE GENERATOR UNIT

BACKGROUND OF THE INVENTION

1. Field of the Invention

This invention relates to improvements in a gas turbine generator unit in which a generator is driven by a gas turbine, and more particularly to an arrangement of an air filter box and an intake silencer to render the gas turbine generator unit small-sized and portable.

2. Description of the Prior Art

A gas turbine as a prime mover for driving a so-called portable small-size generator unit of the high speed type is disclosed, for example, in Japanese Patent Provisional Publication No. 61-121740.

This type of generator unit requires an intake silencer to attenuate high frequency noise generated from a compressor in the gas turbine. A long intake air passage of the intake silencer is necessary to obtain a sufficient noise reduction effect. This causes the generator unit to be large in size.

Additionally, the generator of this type is usually provided with a generated energy control circuit for controlling current flowing in the field coil of the generator to regulate generated voltage and thereby provide an appropriate electric power. Such a generated energy control circuit includes heat generating parts such as power transistors; therefore, an electric fan is necessary to cool the control circuit. Furthermore, a location for installing the electric fan is restricted. This also causes the generator unit to be made large in size.

SUMMARY OF THE INVENTION

It is an object of the present invention to provide an improved gas turbine generator unit which can overcome the drawbacks encountered in a conventional gas turbine generator unit.

Another object of the present invention is to provide an improved gas turbine generator unit which is small-sized and portable, while sufficiently reducing air intake noise generated from a compressor of a gas turbine.

A further object of the present invention is to provide an improved gas turbine generator unit in which an air filter box and an intake silencer are located in a manner ensuring sufficient length of the intake silencer air passage to obtain a sufficient noise reduction effect while maintaining the small size of the generator unit.

A gas turbine generator unit of the present invention comprises a gas turbine including a compressor and a rotor shaft. A generator is provided and has a rotatable shaft which is coaxially connected with the gas turbine rotor shaft. An air filter box having an air filter element is provided and arranged such that an extension of an axis of the generator rotatable shaft passes through said air filter box. The air filter box is located on an opposite side of the gas turbine compressor with respect to the generator. Additionally, an intake silencer for attenuating intake air noise is disposed to fluidly connect the air filter box and an air intake port of said compressor. The intake air silencer is disposed to extend generally parallel with the axis of the generator rotatable shaft. Preferably, a control circuit for controlling energy generated by the generator is disposed between the generator and the air filter box and attached to a heat radiating plate having a heat radiating section projected in the air filter box.

Accordingly, by virtue of the construction in which the generator is directly driven by the gas turbine, it is made possible to use the generator of the high speed type and of the small size. As a result, even though the generator and the intake silencer are disposed parallel with each other, the total cross-sectional area of the generator and the intake silencer is smaller than the cross-sectional area of the gas turbine, so that the gas turbine generator unit is prevented from being made large-sized. The parallel arrangement of the generator and the silencer reduces restriction applied on the length of an air passage and the shape of a sound absorbing material in the intake silencer thereby obtaining a sufficient noise reduction effect. Thus, the gas turbine generator unit of the present invention can be small-sized while largely reducing intake noise. In case that the gas turbine generator is provided with the generated energy control circuit, the gas turbine generator unit can be prevented from being large-sized by disposing the generated energy control circuit between the generator and the air filter box. Furthermore, heat generated from the control circuit can be radiated through the heat radiating plate into air flowing through the air filter box and therefore the control circuit is sufficiently cooled.

DETAILED DESCRIPTION OF THE INVENTION

Figure 1:
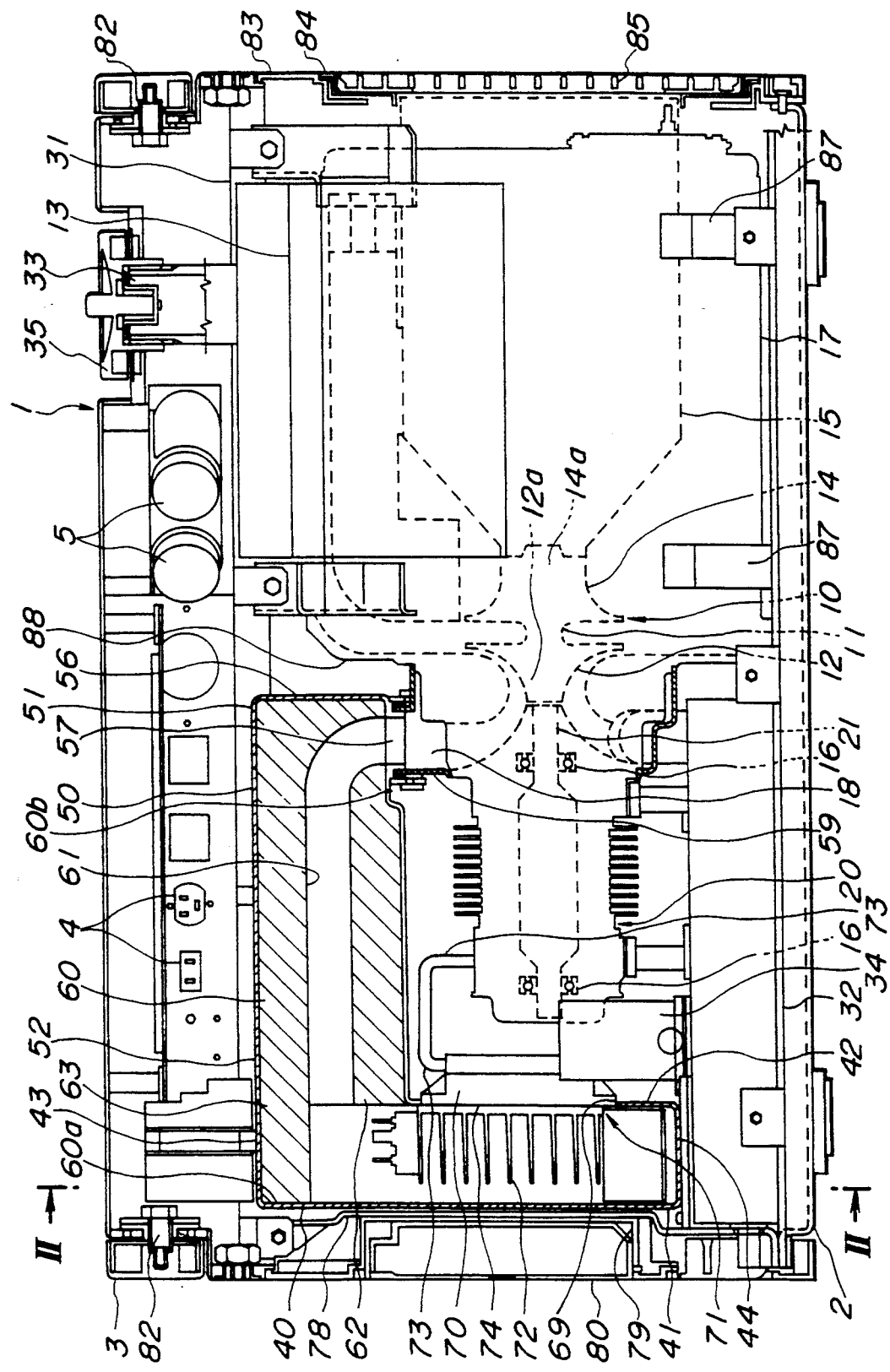
FIG. 1 is a cross-sectional view of an embodiment of a gas turbine generator unit in accordance with the present invention.
Figure 2:
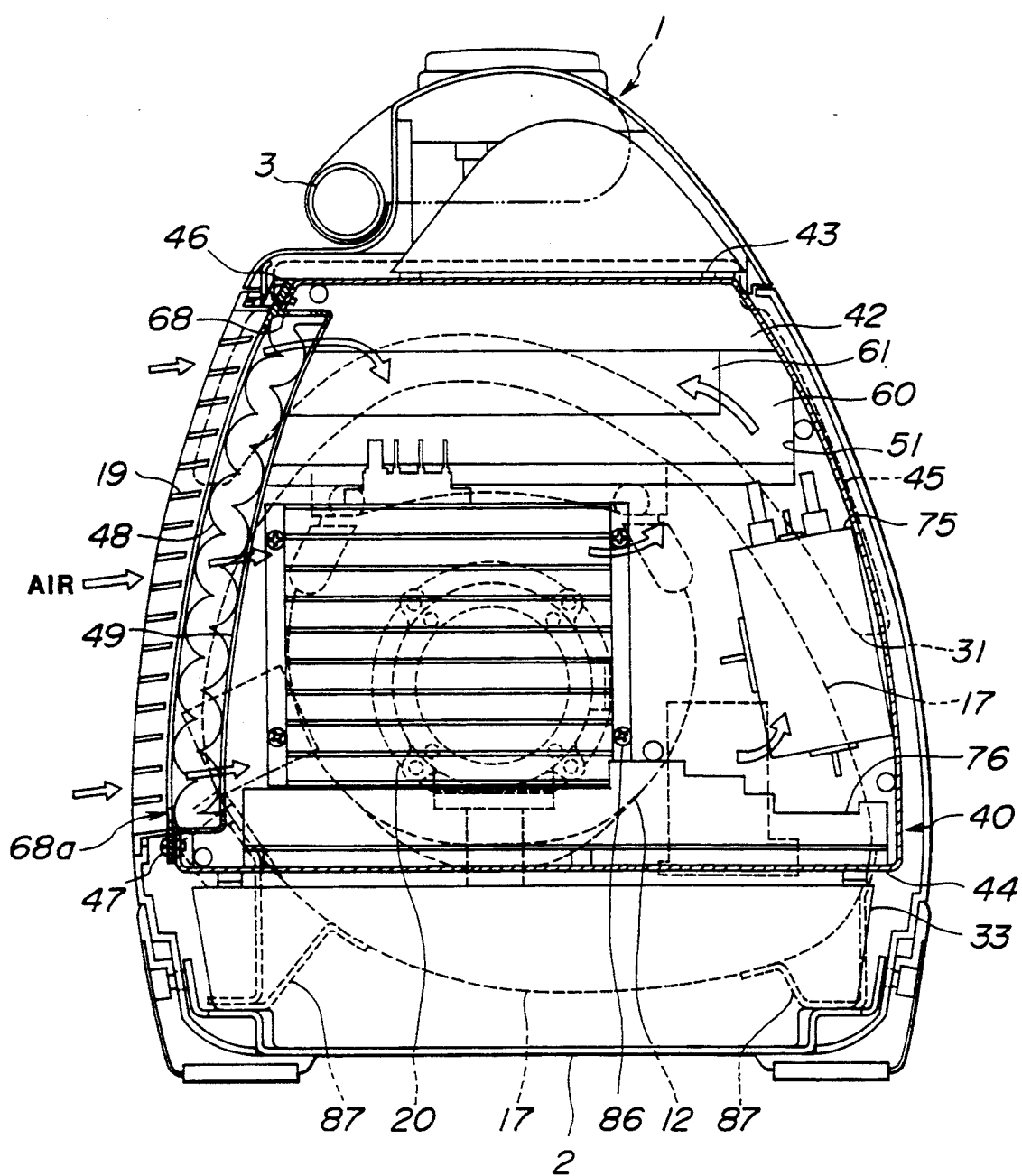
FIG. 2 is a cross-sectional view of the gas turbine generator taken in the direction of arrows substantially along the line of II—II of FIG. 1.

Referring now to FIGS. 1 and 2, an embodiment of a gas turbine generator unit 1 according to the present invention comprises a gas turbine 10 and a generator 20 which are housed in a casing 2, and arranged to be portable. The gas turbine generator unit 1 is provided at its upper section with a handle 3 by which the unit 1 can be carried by an operator. The handle 3 is rotatably mounted on a pair of oppositely projecting shafts 82, 82 and retractable in a depression (no numeral) of the casing 2. Additionally, the gas turbine generator unit 1 is provided with plug sockets 4 to which electric cords (not shown) are to be connected, and switches 5 for operating it.

A gas turbine enclosure 17 is disposed inside and installed to the casing 2 through a plurality of stays 87. The gas turbine 10 includes a combustor 13, a turbine 14 and a regenerator 15 which are disposed inside the enclosure 17. A compressor 12 forming part of the gas turbine 10 is connected to a front wall section 88 of the gas turbine enclosure 17. More specifically, a compressor 12a of the compressor turbine 12 is integrally and coaxially connected with a turbine wheel 14a of the turbine 14 through a rotor shaft 11. The compressor wheel 12a and the turbine wheel 14a are coaxially and fixedly mounted on the rotor shaft 11. The compressor 12 is located outside and in front of a front wall section of the gas turbine enclosure 17. The regenerator 15 is located generally in series with the turbine 14 and the compressor 12. In other words, the axis of the regenerator 15 is aligned with the axes of the turbine 14 and the compressor 12. The combustor 13 is located generally in parallel with the regenerator 15. The casing 2 has a rear wall section 83 formed with an exhaust gas outlet 84. Grid-like louver boards 85 are provided at the exhaust gas outlet 84. It will be understood that combusted or hot gas is supplied through the turbine 14 and then to the regenerator 15, and thereafter discharged from the exhaust gas outlet 84.

A generator 20 includes a rotatable shaft 21 which is coaxially connected and aligned with the rotor shaft 11 of the gas turbine 10. The rotatable shaft 21 is rotatably supported by a pair of rolling bearings 16, 16 which are axially separate from each other to support the opposite end sections thereof. A first fuel tank 31 is disposed over the gas turbine enclosure 17. A second fuel tank 32 is disposed below the generator 20. The first fuel tank 31 is formed at its upper section with a fuel supply inlet 33 to which a filler cap 35 is fitted. Fuel in the first fuel tank 31 is introduced into the second fuel tank 32 through a pipe (not shown). Fuel stored in the second fuel tank 32 is supplied through a fuel pump 34 to a fuel injector valve (not shown) located in the combustor 13.

Figure 3:
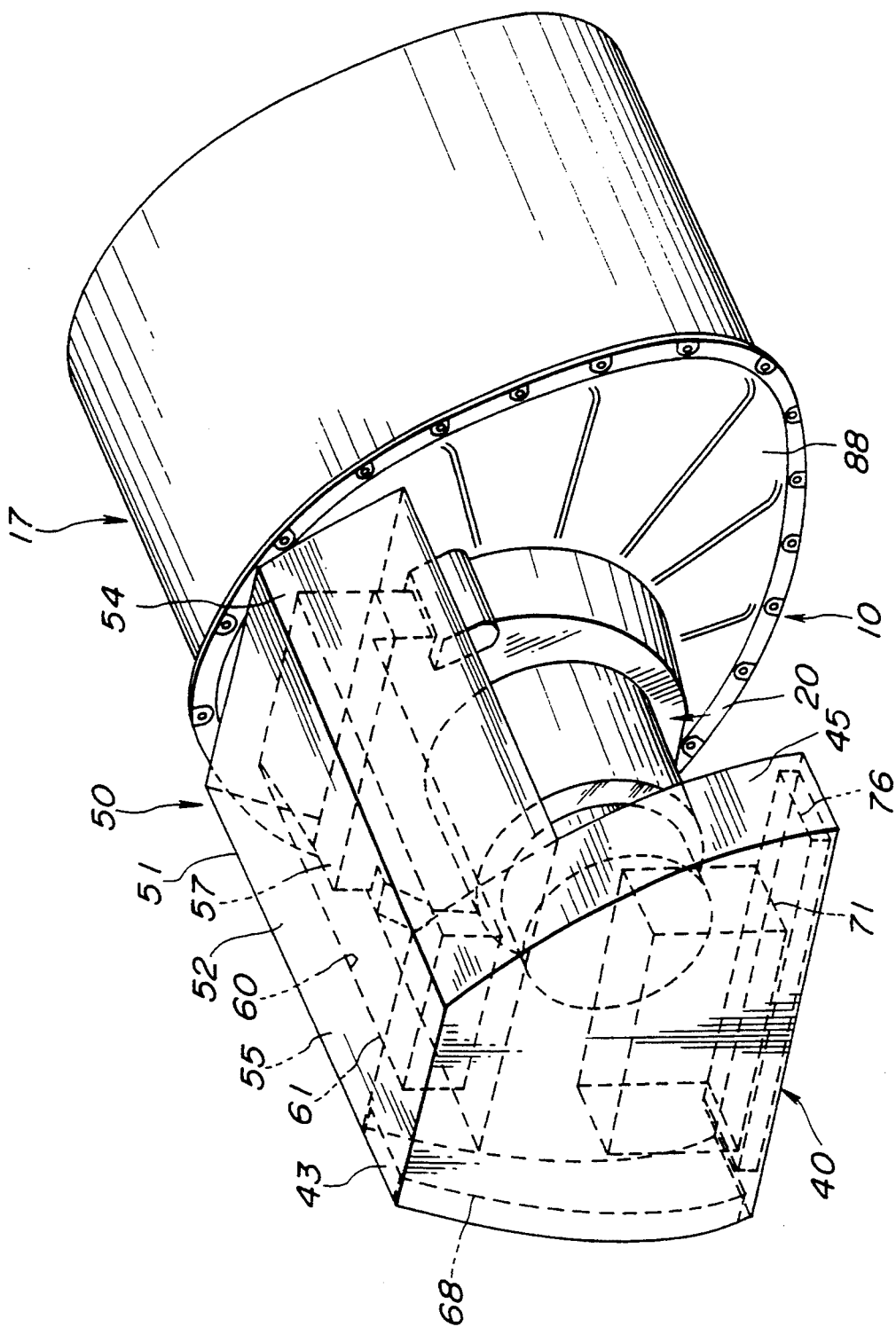
FIG. 3 is a perspective view of an arrangement of the gas turbine generator unit of FIG. 1, enclosed in a casing.
Figure 4:
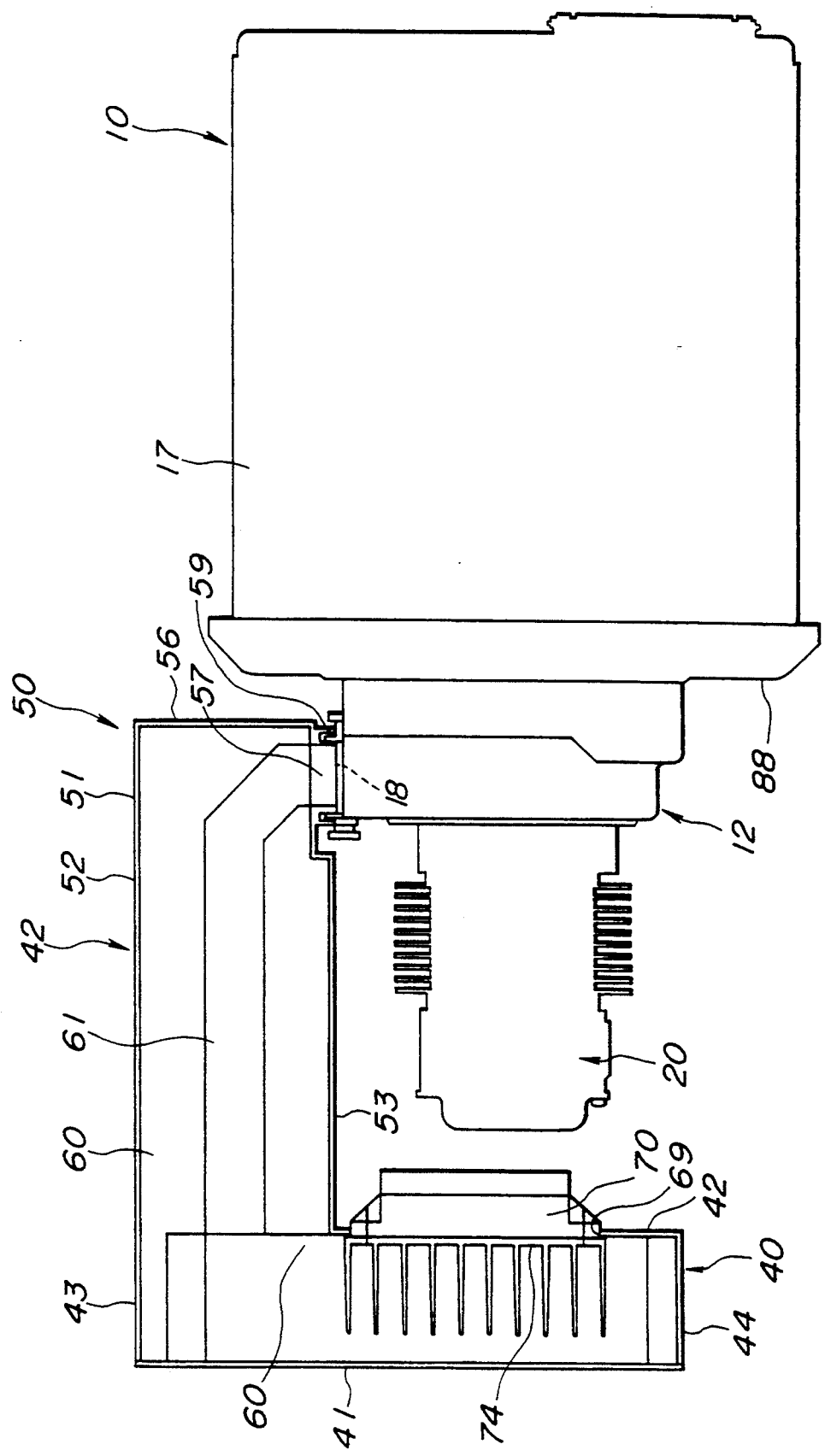
FIG. 4 is a schematic sectional view of the arrangement of FIG. 3.

The gas turbine enclosure 17 is formed generally in the shape of a cylinder having an elliptical cross-section as seen from FIG. 3. In this connection, the first fuel tank 31 is curved in cross-section having a curvature corresponding to that of the upper section of the gas turbine enclosure 17, so that it is located in a manner to cover the upper section of the gas turbine enclosure 17. Accordingly, the first fuel tank 31 serves to suppress emission of noise from the gas turbine enclosure to the outside of the casing 2.

As shown in FIGS. 1–4, an air filter box 40 is disposed on the opposite side of the compressor turbine 12 with respect to the generator 20, and located in such a manner that the axis of the generator rotatable shaft 21 is perpendicular to the air filter box 40. An intake silencer 50 is disposed above the generator 20 and extends parallel to the axis of the generator rotatable shaft 21. The intake silencer 50 is arranged to fluidly connect the air filter box 40 and an air intake port 18 of the gas turbine 10. The generator 20 serves also as a starter motor for the gas turbine 10 during starting of the gas turbine 10. A battery 80 is provided to supply driving electric current to the generator 20 during the starting of the gas turbine 10. The battery 80 is disposed in front of and parallel with the air filter box 40. The casing 2 is provided at its front wall section 78 with a case 79 in which the battery 80 is disposed.

The air filter box 40 includes front and rear wall sections 41, 42 to which the axis of the rotatable shaft 21 of the generator 20 is perpendicular. The front and rear wall sections 41, 42 are integral with upper and lower wall sections 43, 44 of the air filter box 40, which are generally horizontal and perpendicular to the front and rear wall sections 41, 42. A left wall section 45 of the air filter box 40 is curved along the inner wall of the casing 2 and integral with the front, rear, upper and lower wall sections 41, 42, 43, 44. With such wall sections, the air filter box 40 is formed into the shape of a flat box as seen from FIG. 3. A fight wall section 46 of the air filter box 40 is provided opposite to the left wall section 45 and integral with the front, rear, upper and lower wall sections 41, 42, 43, 44. The right wall section 46 is formed with an air introduction opening 68 to which an air filter element assembly 68A is fitted. The air filter element assembly 68A is fastened to the right wall section 46 with small screws 47, and includes an air filter element 48 for filtering air to be inducted to the gas turbine 10. The air filter element 48 is fixedly and sealingly supported to an element holder 49. The casing 2 is provided with louver boards 19 which are located facing the air introduction opening 68, so that outside air is introduced through the louver boards 19 and the filter element 48 into the air filter box 40.

The intake silencer 50 includes a duct 51 which is formed integral with the air filter box 40 so that air sucked into the air filter box 40 is introduced through the duct 51 to the compressor 12 of the gas turbine 10. The duct 51 includes upper and lower wall sections 52, 53 which are generally horizontal and extend along the axis of the rotatable shaft 21 of the generator 20. The upper and lower wall sections 52, 53 are integral with left and fight wall sections 54, 55 which are curved along the inner wall of the casing 2 as shown in FIG. 3. A rear wall section 56 of the intake silencer 50 is integral with the upper, lower, left and fight wall sections 52, 53, 54, 55 and perpendicular to the upper wall section 52. Accordingly, the air intake silencer duct 51 is formed box-shaped. It will be understood that the upper and lower wall sections 52, 53 of the duct 51 are integrally connected respectively with the upper and rear wall sections 43, 42 of the air filter box 40, and the left and right wall sections 54, 55 of the duct 51 are integrally connected respectively with the left and right wall sections 45, 46 of the air filter box 40. The lower wall section 53 of the duct 51 is formed with an opening 57 which is in communication with the compressor 12 of the gas turbine 10. As shown, the upper wall section 52 of the duct 51 is contiguous and flush with the upper wall section 43 of the air filter box 40. The lower wail section 53 of the duct 51 is perpendicular to the rear wail section 42 of the air filter box 40.

Figure 5:
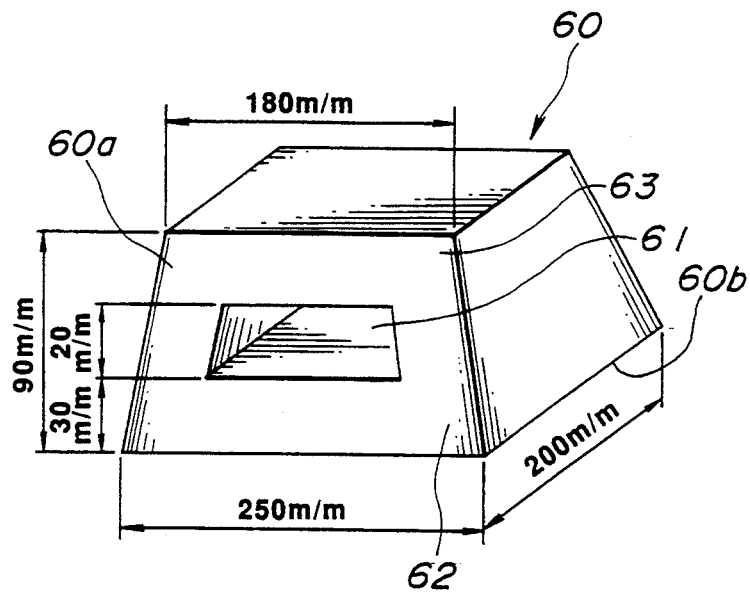
FIG. 5 is a perspective view of a sound absorbing material disposed in an intake silencer of the gas turbine generator unit of FIG. 1.

A sound absorbing material 60 is disposed inside the duct 51 of the air intake silencer 50 and formed of rock wool or fiber so as to attenuate or reduce intake noise generated in the compressor turbine 12 of the gas turbine 10. The sound absorbing material 60 may be formed of a porous material in place of the rock wool. As shown in FIG. 5, the sound absorbing material 60 is formed generally in the shape of a flat prismoid. The sound absorbing material 60 is formed at its central section with an air passage 61 which is trapezoidal in cross-section and extends to connect the front inclined wall surface 60a and the bottom wall surface 60b of the material 60 at the rear end section as seen from FIG. 1. The air passage 61 has a length of 200 mm and a height (vertical dimension) of 20 mm. The air passage 61 is defined between a lower wall section 62 having a thickness of 30 mm and a bottom width of 250 mm and an upper wall section 63 having a thickness of 40 mm and a top width of 180 mm. It will be understood that the above-mentioned respective dimensions may be changed corresponding to frequency regions of noise to be attenuated or reduced, and set to obtain a sufficient noise attenuation effect under experiments.

A generated energy control circuit 70 is provided to control electric current flowing in a field coil (not shown) of the generator through a cable 73 so as to regulate generated voltage thereby supplying an appropriate electric power. The control circuit 70 includes heat generating parts such as power transistors. The control circuit 70 is disposed between the air filter box 40 and the generator 20 and attached to a heat radiating plate 71 which is located projecting in the air filter box 40. The heat radiating plate 71 includes a plurality of heat radiating fins 72 located in the air filter box 40. The heat radiating fins 72 project from a heat transferring section 74 which has a back surface on which the generated energy control circuit 70 is secured, so that heat generated by the power transistors or the like is radiated to intake air flowing through the air filter box 40. The heat radiating plate 71 is fitted in an opening 69 formed in the rear wall section 42 of the air filter box 40, and fastened to the air filter box 40 with a plurality of small screws 86. The heat radiating fins 72 are parallel with each other, and extend horizontally and in a direction generally parallel with air flow passing through the air filter box 40.

As shown in FIG. 2, a capacitor 75 is disposed by the heat radiating plate 71 in the air filter box 40 as shown in FIG. 2. Additionally, a variety of electrical pans 76 are disposed under the heat radiating plate 71 in the air filter box 40 and therefore cooled with clean air flowing through the air filter box 40.

The functions of the thus arranged gas turbine generator unit will be discussed hereinafter.

By virtue of the arrangement in which the intake silencer 50 is disposed parallel with the rotatable shaft 21 of the generator 20 while the air filter box 40 is disposed such that the extension of the axis of the generator rotatable shaft 21 is perpendicular to the air filter box 40, the width and height of the gas turbine generator unit 1 is suppressed to their minimum dimensions thereby making the unit 1 small-sized. By virtue of the arrangement in which the generator 20 is driven by the gas turbine 10, the generator 20 of the high speed type can be employed thereby making the unit 1 further small-sized, so that the total cross-sectional area of the generator 20 and the intake silencer 50 is smaller than the cross-sectional area of the gas turbine even though the generator 20 and the intake silencer 50 are arranged parallel with each other. In other words, the width of the casing 2 is determined by the width of the gas turbine enclosure 17, and the height of the casing 2 is determined by the height of the gas turbine enclosure 17 and the first fuel tank 31. Thus, the dimensions of the gas turbine generator unit 1 are prevented from increasing owing to existence of the air filter box 40 and the intake silencer 50. Additionally, by forming the air filter box 40 in the flat box shape, the length of the casing 2 is suppressed.

Air intake noise generated from the compressor 12 is attenuated or reduced by the sound absorbing material 60 during passage of intake air through the intake silencer 50. Additionally, the same intake air noise is attenuated by being diffused throughout the intake silencer 50 and the air filter box 40.

By arranging the intake silencer 50 in parallel with the rotatable shaft 21 of the generator 20, a sufficient length of the intake air passage 61 defined in the sound absorbing material 60 can be obtained while ensuring a sufficient noise attenuation effect without making the gas turbine generator unit 1 large-sized upon suitably shaping the sound absorbing material 60.

Figure 6:
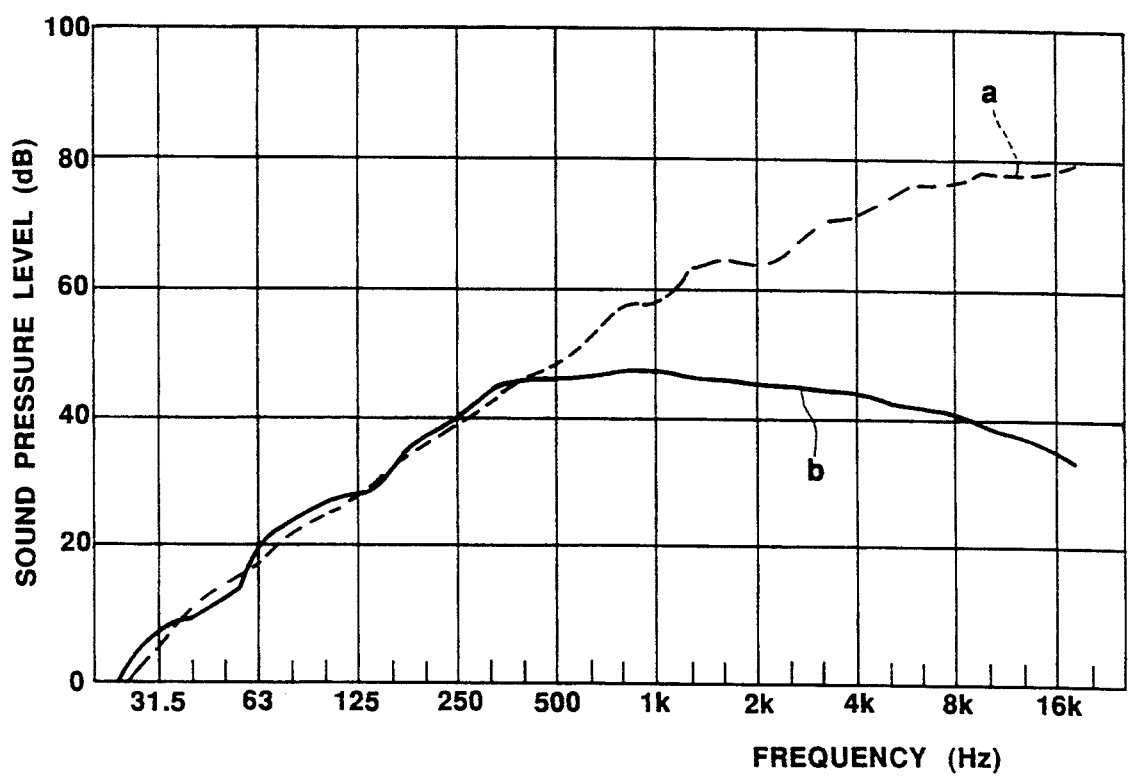
FIG. 6 is a graph showing experimental results demonstrating a noise reduction effect of the gas turbine generator unit of FIG. 1.

In order to demonstrate the effects of the above-arranged gas turbine generator unit 1 according to the present invention, experiments were conducted on the gas turbine generator unit 1 as shown in FIGS. 1 to 5. The results of the experiments are shown in FIG. 6 in which a curve a indicates a sound pressure level (dB) of air intake noise generated from the compressor 12 whereas a curve b indicates a sound pressure level (dB) of intake air noise transmitted to the outside of the casing 2. The experimental results demonstrated that the sound pressure level of air intake noise in the compressor 12 rose as frequency (Hz) of the noise increased, whereas the sound pressure level of the noise transmitted to the outside of the casing 2 was largely lowered in a high frequency region higher than 500 Hz and suppressed below 50 dB.

Air stream flowing in the air filter box 40 through the louver boards 19 and the air filter element 48 moves along the heat radiating fins 72 of the hear radiating plate 71 and then moves to the air intake silencer 50, in which heat generated in the generated energy control circuit 70 is released through the heat radiating plate 71. As a result, the temperature of the generated energy control circuit 70 can be maintained at an appropriate levels.

Since the air introduction opening 68 of the air filter box 40 is opened at a front and side portion of the casing 2 whereas the exhaust outlet 84 for the gas turbine 10 is opened at the rear wall section 83 of the casing 2, exhaust gas is prevented from being mixed with intake air sucked through the air introduction opening 68. The generated energy control circuit 70 is disposed between the air filter box 40 and the generator 20, and therefore the generator unit 1 is prevented from being made large-sized while shortening the cable 73 through which current generated by the generator 20 is introduced to the generated energy control circuit 70 thereby minimizing an outlet loss.

What is claimed is:

1. A gas turbine generator unit, comprising:
   a gas turbine including a compressor and a rotor shaft;
   a generator having a rotatable shaft which is coaxially connected with said gas turbine rotor shaft;
   an air filter box having an air filter element and being arranged such that an extension of an axis of said generator rotatable shaft passes through said air filter box, said air filter box being located on an opposite side of said generator with respect to said compressor; and
   an intake silencer for attenuating intake air noise, and being disposed to fluidly connect said air filter box with an air intake port of said compressor, said intake air silencer extending generally parallel with the axis of said generator rotatable shaft.

2. A gas turbine generator unit as claimed in claim 1, further comprising a control circuit for controlling energy generated by said generator and being located between said generator and said air filter box; and a heat radiating plate having a heat radiating section projecting into said air filter box, said control circuit being securely attached to said heat radiating plate.

3. A gas turbine generator unit as claimed in claim 2, wherein said control circuit includes a power transistor which generates heat.

4. A gas turbine generator unit as claimed in claim 1, wherein said air filter box is in a flat box shape and perpendicular to the extension of the axis of said generator rotatable shaft.

5. A gas turbine generator unit as claimed in claim 1, wherein said air filter box is integrally connected and perpendicularly arranged with respect to said intake air silencer.

6. A gas turbine generator unit as claimed in claim 5, wherein said air filter box has an upper wall section which is integrally connected with an upper wall section of said intake air silencer in such a manner that surfaces of said upper wall sections are flush with each other.

7. A gas turbine generator unit as claimed in claim 5, wherein said intake air silencer is located above said generator and between said air filter box and said gas turbine.

8. A gas turbine generator unit as claimed in claim 1, further comprising a casing in which said gas turbine, generator, air filter box and intake silencer are disposed, said casing being portable.

9. A gas turbine generator unit as claimed in claim 1, further comprising a sound absorbing material within said intake air silencer and formed with an air passage through which intake air from said air filter box is supplied to said air intake port of said compressor.

10. A small-size gas turbine generator unit, comprising:
a gas turbine including a compressor and a rotor shaft;
a generator having a rotatable shaft which is coaxially connected with said gas turbine rotor shaft;
an air filter box having an air filter element and being arranged such that an extension of an axis of said generator rotatable shaft passes through said air filter box, said air filter box being disposed adjacent said generator and located on an opposite side of said generator with respect to said compressor; and
an intake silencer for attenuating intake air noise, disposed to fluidly connect said air filter box and an air intake port of said compressor, said intake air silencer being disposed adjacent said generator and extending generally parallel with the axis of said generator rotatable shaft.

11. A gas turbine generator unit as claimed in claim 10, further comprising a control circuit for controlling energy generated by said generator and being located between said generator and said air filter box; and a heat radiating plate having a heat radiating section projecting into said air filter box, said control circuit being securely attached to said heat radiating plate.

12. A gas turbine generator unit as claimed in claim 11, wherein said control circuit includes a power transistor which generates heat.

13. A gas turbine generator unit as claimed in claim 10, wherein aid air filter box is in a flat box shape and perpendicular to the extension of the axis of said generator rotatable shaft.

14. A gas turbine generator unit as claimed in claim 10, wherein said air filter box is integrally connected and perpendicularly arranged with respect to said intake air silencer.

15. A gas turbine generator unit as claimed in claim 14, wherein said air filter box has an upper wall section which is integrally connected with an upper wall section of said intake air silencer in such a manner that surfaces of said upper wall sections are flush with each other.

16. A gas turbine generator unit as claimed in claim 14, wherein said intake air silencer is located above said generator and between said air filter box and said gas turbine.

17. A gas turbine generator unit as claimed in claim 10, further comprising a casing in which said gas turbine, generator, air filter box and intake silencer are disposed, said casing being portable.

18. A gas turbine generator unit as claimed in claim 1, further comprising a sound absorbing material within said intake silencer and formed with an air passage through which intake air from said air filter box is supplied to said air intake port of said compressor.

* * * * *